April 19, 1966　　　K. W. DE BAUN　　　3,246,457
PLEATED AIR FILTER CARTRIDGE
Filed April 19, 1962　　　2 Sheets-Sheet 2
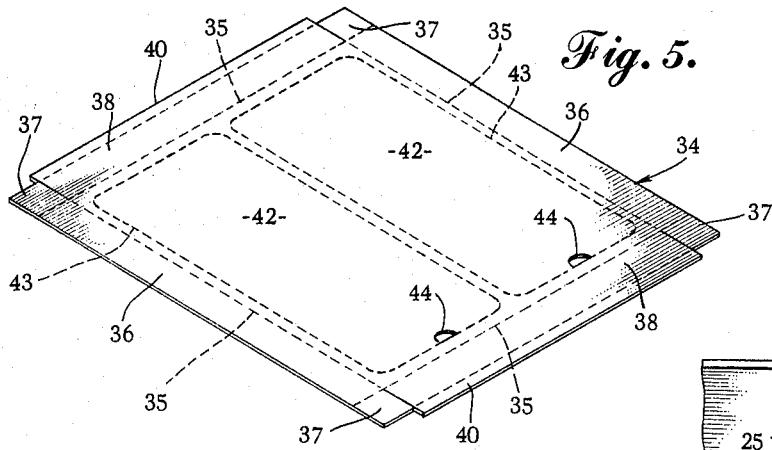
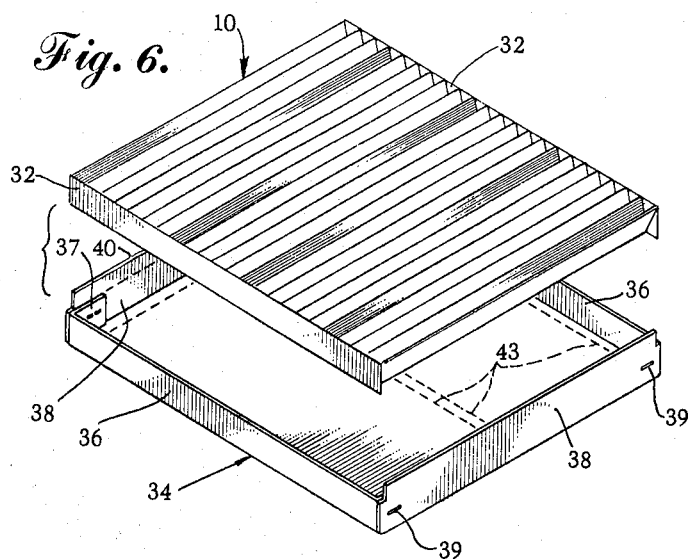
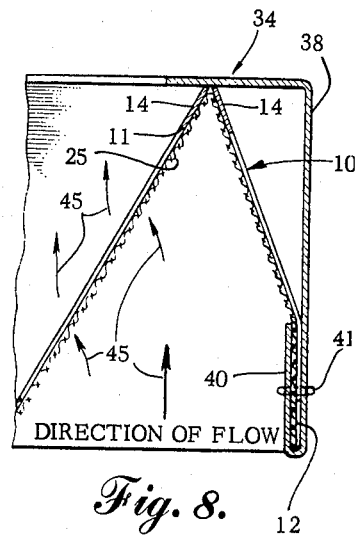
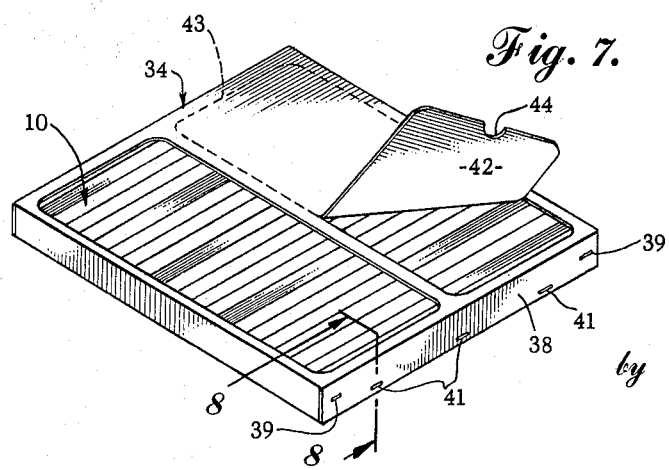
Inventor
KENNETH W. DeBAUN
by Lyon & Lyon
Attorneys

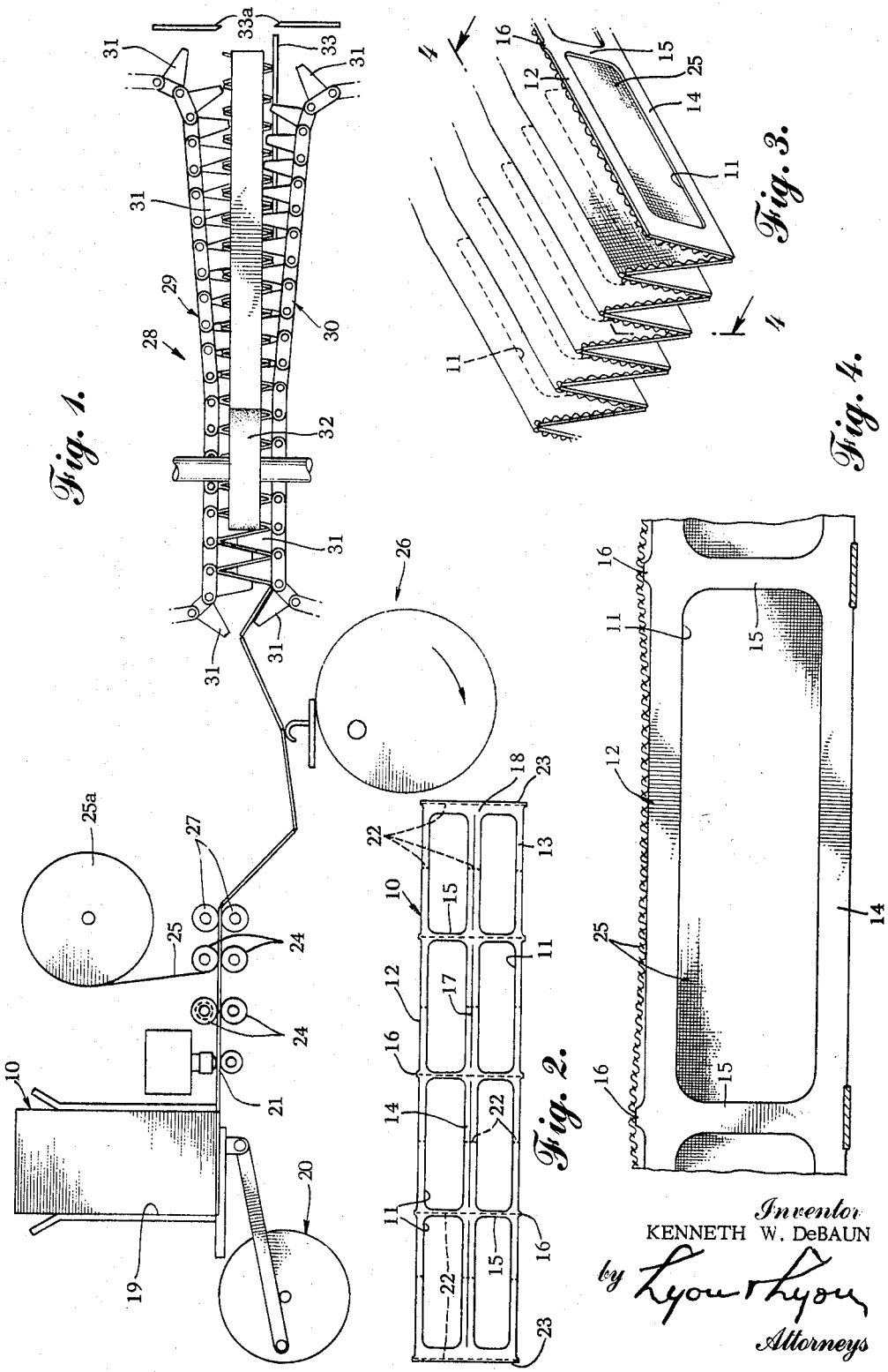

United States Patent Office 3,246,457
Patented Apr. 19, 1966

3,246,457
PLEATED AIR FILTER CARTRIDGE
Kenneth W. De Baun, Novato, Calif., assignor to Farr Company, El Segundo, Calif., a corporation of California
Filed Apr. 19, 1962, Ser. No. 188,634
4 Claims. (Cl. 55—499)

This invention relates to air filters for removing foreign materials from air entering an inlet duct to an air conditioning system or other type of air supply system and, in particular, is directed to a self-contained air filter cartridge for such use which is sufficiently inexpensive in its manufacture to be entirely disposable after use.

In most air conditioning and air supply systems, it is generally desirable to filter some of the foreign materials such as dust or dirt particles out of the air which is being supplied to the system. The amount of foreign material desired to be extracted from the incoming air or correspondingly the amount of foreign material which is tolerable in the particular air conditioning or supply system will dictate the particular type of filtering media which must be used. If only relatively large particles need to be eliminated a filter utilizing wire screen media may be adequate, whereas if relatively fine dust particles must be removed from the incoming air the filter media must normally consist of such materials as cloth-backed cotton, polyurethane foam, glass-coated cloth, spun nylon, and the like.

A further problem in the filtration of air is that the foreign material extracted from the incoming air accumulates and the filtering media eventually becomes sufficiently clogged or loaded with dirt that its resistance to air flow becomes excessive. When this occurs, the media must be either replaced or cleaned. This problem is aggravated in the case of filter media of the types described which are effective for the finer dirt particles. With most types of such media, it is impractical to clean the same and it therefore has become relatively common to use inexpensive disposable filter cartridges.

Filtering materials which provide reasonable efficiencies in the removal of the relatively finer foreign particles have relatively high resistance to the flow of air therethrough. As a result it is generally desirable to provide an area of filtering media for the air to flow through which is greater than the area of the air inlet duct to the air conditioning or supply system. To accomplish this, it is common practice to corrugate or pleat the filtering media thereby increasing the area of filtering media through which the air may flow. Most types of filtering media which are effective against finer dirt particles are not sufficiently rigid to be self-supporting in this corrugated or pleated configuration, with the result that some apparatus must be supplied to support the filtering media.

While various expedients have been used to provide this support, including wire baskets, rigid frameworks which carry supporting wires and the like, the least expensive and most widely used have been various cardboard members used as a framework to support the filtering media in a self-contained cartridge. Such cartridges, however, have certain objectionable features. For example, the cardboard support is such that the adjacent pleats of media are flexed by the air stream so as to cling one to the other thereby reducing the effective area of filtering material available for air to pass through. To partially avoid this, it is necessary that the space between the pleats and/or the angle between the pleats must be relatively large thereby restricting the area of filtering material.

In order for a filtering cartridge to be sufficiently inexpensive to be disposable after replacement, the materials used must be inexpensive, the quantity of materials minimized, and the manufacture of the cartridge must be relatively rapid and inexpensive. In accordance with the present invention, there is provided a self-contained disposable filter cartridge which is relatively efficient against finer dirt particles. This cartridge incorporates inexpensive materials which may be inexpensively assembled. Further, the filtering media is sufficiently supported in its pleated condition to obtain a maximum effective area of filtering media for a given size of filter cartridge consistent with a low resistance to air flow through the filter cartridge.

Accordingly it is a principal object of this invention to provide a novel form of self-contained pleated air filtering cartridge which is sufficiently inexpensive to be disposable.

Another object of this invention is to provide a novel form of disposable pleated filter cartridge wherein the pleats of the media are supported in such manner as to permit a maximum effective area of filtering media.

A more detailed object of this invention is to provide a pleated disposable filter cartridge utilizing novel apertured cardboard strips which are secured to the filtering material and folded longitudinally to effectively support each pleat.

Another and specific object of this invention is to provide a novel form of self-contained disposable pleated filtering cartridge which is adapted to be automatically manufactured in part, for minimizing the costs of production.

Other and more detailed objects and advantages of this invention will appear from the following description and the accompanying drawings.

In the drawings:

FIGURE 1 is a schematic elevation view of the apparatus and operation for applying filtering material to support strips and pleating the combination.

FIGURE 2 is a plan view of one of the support strips prior to assembly.

FIGURE 3 is a fragmentary perspective view of the assembled and pleated filtering material and support strips.

FIGURE 4 is an enlarged sectional elevation view taken sustantially on the line 4—4 as shown in FIGURE 3.

FIGURE 5 is a perspective view of the frame of the filtering cartridge prior to assembly.

FIGURE 6 is an exploded view illustrating the pleated filtering material and support strips ready to be installed in the assembled frame of the cartridge.

FIGURE 7 is a perspective view of the assembled pleated filtering cartridge from the reverse side as the side shown in FIGURE 6, and with one tear-out panel removed and the other tear-out panel partially removed.

FIGURE 8 is a sectional elevation view taken substantially on the line 8—8 as shown in FIGURE 7.

Referring now to the drawings, means are provided for supporting the filtering media and, as shown, these means may comprise a plurality of individual support strips each generally designated 10. The support strips 10 are hereinafter described as being constructed of cardboard. As used herein, the term "cardboard" is intended to include such inexpensive material as chipboard, paperboard, cardboard, or certain plastic materials which can be scored and folded in the manner hereinafter described.

Each support strip is preferably die cut from relatively thin cardboard or chipboard. A plurality of apertures 11 (eight of which are cut in the strip illustrated in FIGURE 2) are cut out of each support strip leaving a pair of longitudinal edge ribs 12 and 13 and a longitudinal central rib 14. As illustrated by FIGURES 2 and 4, the apertures 11 form a major portion of the area of the support strip 10. The edge ribs 12 and 13 are each joined to the central rib 14 by lateral ribs 15. Thus, it will be seen that a portion of either edge rib 12 or 13, a portion of the central rib 14, and a pair of lateral ribs 15 form each aperture 11. Each of the edge ribs 12 and 13 is provided with a number of protuberances 16 projecting from the side of the edge rib at a location adjacent each lateral rib 15. The central rib 14 is cut longitudinally and intermittently along its length as shown by line 17 for ease of folding as hereinafter described. In between the longitudinal cuts 17 the central rib 14 is cut-scored on the back side (the side opposite the front side 18 shown in FIGURE 2) part way through the material to further facilitate the longitudinal folding of the support strip 10.

Referring now more particularly to FIGURE 1, an apparatus is schematically shown for assembling the filter media and the support strips and folding the assembly, although it is to be understood that my filter cartridge could be manually manufactured or the apparatus shown could be materially modified or different apparatus substituted for accomplishing the same operations without departing from my invention. The support strips 10 may be stacked in hopper 19 and ejected one at a time from the hopper 19 by apparatus 20. The support strips 10 then pass laterally through gluing rolls 21 where glue is applied to the front side 18 of the strip in a number of lateral stripes as illustrated by dotted lines 22 as shown in FIGURE 2. While I prefer that a continuous stripe 22 of glue is applied along the lateral ribs 15 at each end 23, it is not essential that a continuous stripe be applied on the intermediate lateral ribs 15 or on the edge ribs 12 or 13 at locations intermediate the lateral ribs 15. It has been found that it is sufficient to apply glue merely on the central rib 14 at locations adjacent the lateral ribs 15 and at a midpoint between each pair of lateral ribs 15. However, since the additional unnecessary glue on lateral ribs 15 and edge ribs 12 and 13 is not detrimental to my construction and is merely a consequence of applying the glue in continuous stripes by rolls 21, I do not attempt to prevent the application of glue to these points by the gluing rolls 21. The significance of this particular location of stripes of glue will be hereinafter pointed out in connection with the description of the use of the filter cartridge.

Each of the support strips 10 is advanced from left to right in the appartus of FIGURE 1 by virtue of each support strip engaging the previously ejected support strip and the pulsating feeding of the support strips by apparatus 20. The protuberances 16 on each edge rib 12 engage the like protuberances 16 on the edge rib 13 of the next adjacent support strip 10. Thus it will be seen that the edge ribs 12 and 13 of adjacent support strips are slightly separated (by twice the distance of projection of each protuberance 16) as the support strips progress through the apparatus of FIGURE 1. The support strips 10 then progressively pass through feed rolls 24 as the sheet-type filtering material 25 is drawn off the roll 25a and applied to the glued or front side 18 of the support strips by the feed rolls 24 and pressure is applied by pinch rolls 27 to insure the bonding. Here it may be seen that the assembled material and support strips may be rolled onto a roll for storage pending further use or directed immediately into the folding operation as hereinafter described.

The assembled filtering material and support strips may be fed directly from pinch rolls 27 or from a roll of assembled filtering material and support strips into a folding apparatus such as the one illustrated in FIGURE 1 and generally designated 28. The folding apparatus 28 may include a pair of spaced roller chain assemblies 29 and 30 mechanically driven at the same rate of linear advancement. Blunt pointed pyramidal-shaped bars 31 are mounted on the roller chain assemblies 29 and 30 for folding the support strips. As the roller chain assemblies 29 and 30 advance from left to right, as viewed in FIGURE 1, and the assembled filtering material and support strips are fed from left to right into the apparatus 28, the pyramidal-shaped bars 31 engage the supports strips so that each support strip 10 is bent longitudinally along the cut portion 17 of the rib 14. A cam operated ram assembly generally designated 26, supports the assembled filtering material and support strips in front of the apparatus 28 and raises and lowers in synchronism with apparatus 28 so that the intermeshing of bars 31 folds the support strips along line 17 rather that at an undesirable location. Each bar 31 associated with assembly 30, fits in between adjacent folded support strips 10 and each bar 31 associated with assembly 29 fits between the folded sides of a single support strip. The bars 31 are for maintaining proper positioning of the support strips during the heretofore described folding and subsequent operations. A roll of tape 32 is rotatably mounted on each side of the apparatus 28 adjacent the ends 23 of the support strips and the tape 32 is glued to the ends 23 of the support strips 10 while they are held in proper position by the roller chain assemblies 29 and 30. This proper positioning is maintained by the tape when the bars 31 are slowly withdrawn from between the support strips by the angular separating of assemblies 29 and 30 at the right hand end of the appartus 28, as shown in FIGURE 1. The tape assembly may be supported by a table 33 during the separating of assemblies 29 and 30. The folded and taped assembly may then be chopped off to the desired length by the shearing apparatus 33a for mounting in a frame as hereinafter described.

Since the filtering material is applied to the support strips 10 while they are flat, folding the composite web of support strip and filtering material in apparatus 27 tends to elongate the filtering material at the folds made between adjacent support strips 10 by twice the thickness of the material of the support strips. At the folds made along line 17, no elongation takes place since the filtering material is on the inside of the fold. While some filtering materials could withstand the localized stretching along the entire length of the edge ribs 12 and 13 of adjacent support strips without seriously inhibiting the folding operation or destroying the filtering material, other filtering materials are not sufficiently elastic to permit this folding along an entire edge without appreciable damage to the support strips or the filtering material. I therefore prefer to provide the protuberances 16 which project a short distance, preferably greater than the thickness of the material of the support strips 10, to contact the protuberances 16 of the next adjacent support strip for separating the edge ribs of adjacent support strips so that upon folding there is sufficient loose filtering material between adjacent ribs 12 and 13 of adjacent support strips (in between the protuberances) so that there is no appreciable stretching of the filtering material at locations longitudinally between protuberances. The stretching forces are therefore localized at each of the protuberances 16 and in most filtering materials this individual localized stressing would not seriously inhibit the folding of the strips nor cause appreciable damage to the filtering material. The filtering material therefore assumes a configuration like or similar to that particularly illustrated in FIGURE 4 and also shown in FIGURE 3. This irregular configuration, however, is not illustrated in FIGURE 6 for simplicity of illustration of that figure. Further, it is to be noted that the various ribs and apertures of each support strip 10 would be visible in FIGURE 7 but have been omitted from that figure for clarity of illustration.

Means are provided for supporting the folded, taped filtering material and support strips in a completed assembly and as shown in FIGURES 5, 6, 7 and 8, these means may include the frame generally designated 34. The frame 34 is hereinafter described as being constructed of cardboard but it is to be understood that the term "cardboard" is intended to include such inexpensive materials as chipboard, paperboard, cardboard or certain plastic materials which can be cut-scored and folded in the manner hereinafter described. The frame 34 may be constructed of a flat sheet of cardboard appropriately cut and cut-scored for folding to form a shallow box-type frame for receiving the folded, taped filtering material and support strips. The cardboard of the frame 34 is cut-scored, part-way through the material along the dashed lines 35 in order to facilitate the folding. The sides 36 are first folded up at 90° to the sheet of cardboard and the ears 37 on each end of the sides 36 are folded inwardly at 90° to the side. The ends 38 are then folded upwardly at 90° to the sheet of cardboard and attached to the ears 37 by any convenient means such as gluing and staples 39. The folded, taped assembly of support strips and filtering material cut to the proper length by shearing apparatus 33a is then placed within the frame 34 as shown in exploded view, FIGURE 6, with the filtering material 25 on the upper side of the assembly as depicted in FIGURE 6. The flap portions 40 of ends 38 are each folded over the support strips 10 adjacent that end 38 and secured thereto by any convenient means such as gluing and staples 41. The two strips of tape 32 on either end of the support strips are also glued to the sides 36 to further enchance the overall strength of the assembly. A pair of tear-out panels 42 are provided by cut-scoring the sheet of cardboard of frame 34 along the dashed lines 43. After the assembly of the frame 34 to the filtering material 25 and support strips 10 as described, each of the tear-out panels 42 may be removed by gripping the tear-out panels at finger-holes 44 and progressively tearing the panels 42 out of the frame 34.

The assembled frame 34, supports strips 10 and filtering material 25 forms the air-filtering cartridge which may be mounted in the air inlet duct (or frame thereof) of the air conditioning or air supply system. The air filtering cartridge is mounted in the air inlet duct such that the direction of flow of air is from the side of the support strips 10 on which the filtering material 25 is glued and away from the back side of the support strips 10 as shown by arrows 45 in FIGURE 8. The air flows through the filtering material and through apertures 11 of the support strips 10. Since the filtering material is glued at locations 22 as heretofore described as being at each lateral rib 15 and on the longitudinal rib 14 at each midpoint between each pair of lateral ribs 15, the filtering material 25 will not be urged through the apertures 11 by the flow of air. Without the glue positioned as indicated, it has been found that the filtering material will billow through the apertures 11 to such an extent that the filtering material will contact the filtering material billowing through the aperture 11 of the next adjacent support strip 10. If this latter condition were permitted, the effective filtering area of the filtering material would be greatly reduced. However, it is noted that, as previously described, there is no need for gluing the filtering material on the edge ribs 12 and 13 since the filtering material is folded over these ribs and glued to rib 14 which prevents the billowing heretofore described.

Thus by my arrangement and construction, a relatively inexpensive air filtering cartridge is produced which economically may be disposed of after the filtering material has become sufficiently clogged to be ineffective. Further, by providing nearly complete support for the filtering material, the pleats may be positioned closer together and/or at a smaller angle one to the other without adjacent pleats clinging to each other during the flow of air therethrough which would reduce the effective area of the filtering material.

Having fully described my invention, it is to be understood that I do not wish to be limited to the details herein set forth or to the details illustrated in the drawings, but my invention is of the full scope of the appended claims.

I claim:

1. In a filter cartridge for mounting in an air inlet duct, the combination of: a frame for mounting in the air inlet duct; a plurality of support strips each having a pair of longitudinal edge ribs and a central rib extending generally longitudinally thereof, a plurality of support ribs on each strip joining said central rib to said edge ribs, said ribs defining relatively large apertures through each of said support strips, said apertures comprising a substantial percentage of the total area defined by said support strips, each of said support strips having a V-shape folded along said central rib, the interior surface of each of said V-shaped support strips providing filter media securing areas; a plurality of spaced protuberances on an outer edge of each edge rib, said plurality of support strips positioned laterally adjacent each other across the frame with their edge ribs substantially parallel, the ends of said plurality of support strips being secured to said frame and each protuberance engaging a corresponding protuberance of the adjacent support strip and separating the major portion of the edge ribs of said adjacent support strips; and a flexible filter media sheet secured to said interior surfaces at said securing areas of each of said support strips.

2. The combination of claim 1 wherein said support strips are comprised of sheet cardboard.

3. The combination of claim 1 wherein said filter media is secured to each said lateral support rib and to at least one location on said central rib and both said edge ribs longitudinally between each pair of adjacent support ribs thereby attaching the filter media on all four sides of each said aperture.

4. A self-contained filter cartridge as defined in claim 1 in which a continuous strip of tape is secured to the opposite ends of each of said plurality of support strips joining said support strips together adjacent each other and maintaining said V-shape.

References Cited by the Examiner

UNITED STATES PATENTS

| | | | |
|---|---|---|---|
| 2,008,800 | 7/1933 | Sommers | 55—497 |
| 2,058,669 | 10/1936 | Dollinger | 55—499 |
| 2,108,283 | 2/1938 | Drew et al. | 55—491 X |
| 2,130,806 | 9/1938 | Link | 55—511 X |
| 2,138,874 | 12/1938 | Myers. | |
| 2,201,628 | 5/1940 | McCormick et al. | 55—497 X |
| 2,663,660 | 12/1953 | Layte | 210—448 |
| 2,675,127 | 4/1954 | Layte. | |
| 2,820,733 | 1/1958 | Sorel | 156—108 |
| 2,943,700 | 7/1960 | Bub | 55—500 |
| 3,026,967 | 3/1962 | Stevens et al. | 55—500 |

FOREIGN PATENTS

| | | |
|---|---|---|
| 1,111,568 | 11/1955 | France. |
| 495,320 | 11/1938 | Great Britain. |
| 311,189 | 1/1956 | Switzerland. |

HARRY B. THORNTON, *Primary Examiner.*

REUBEN FRIEDMAN, *Examiner.*